(No Model.) 7 Sheets—Sheet 4.

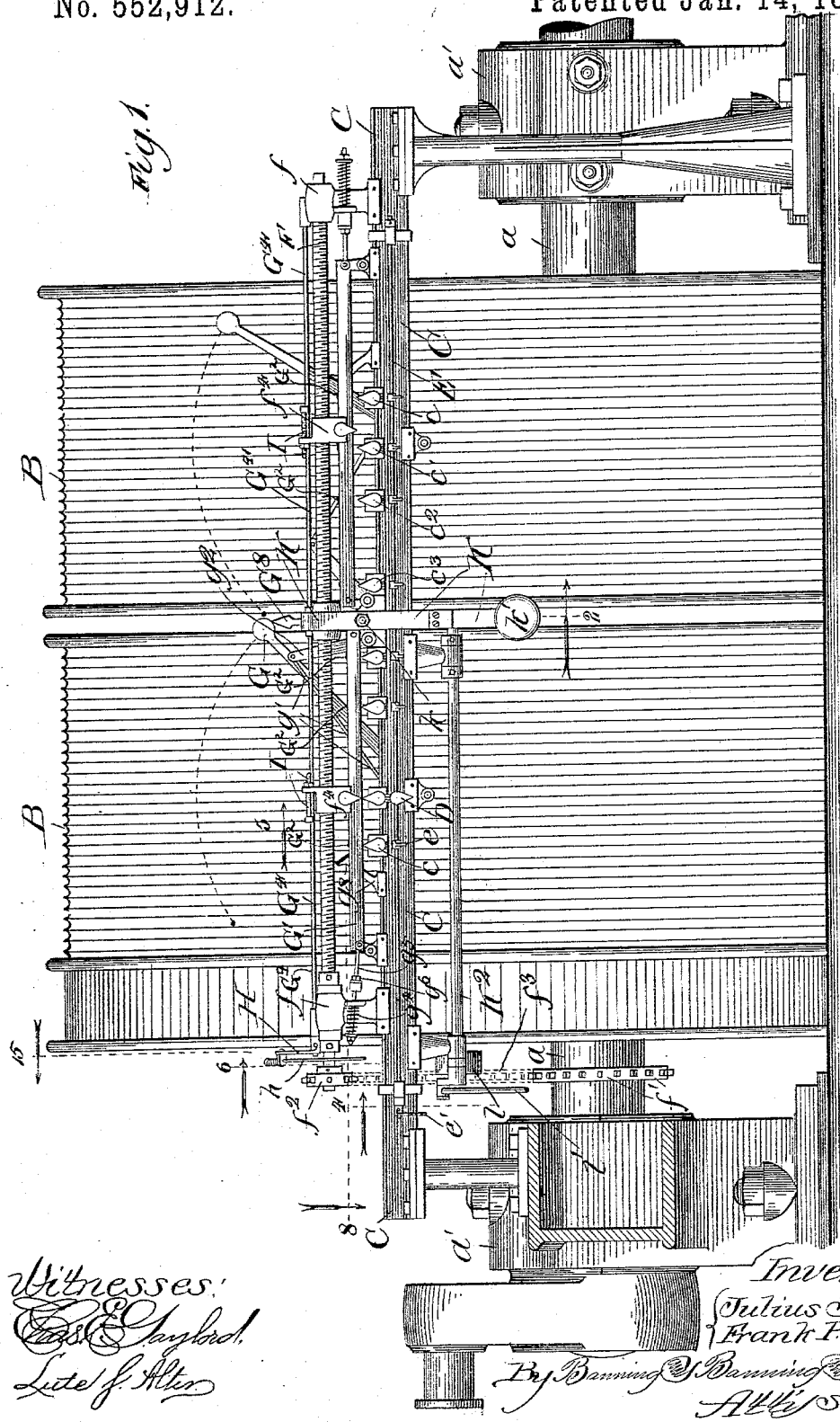

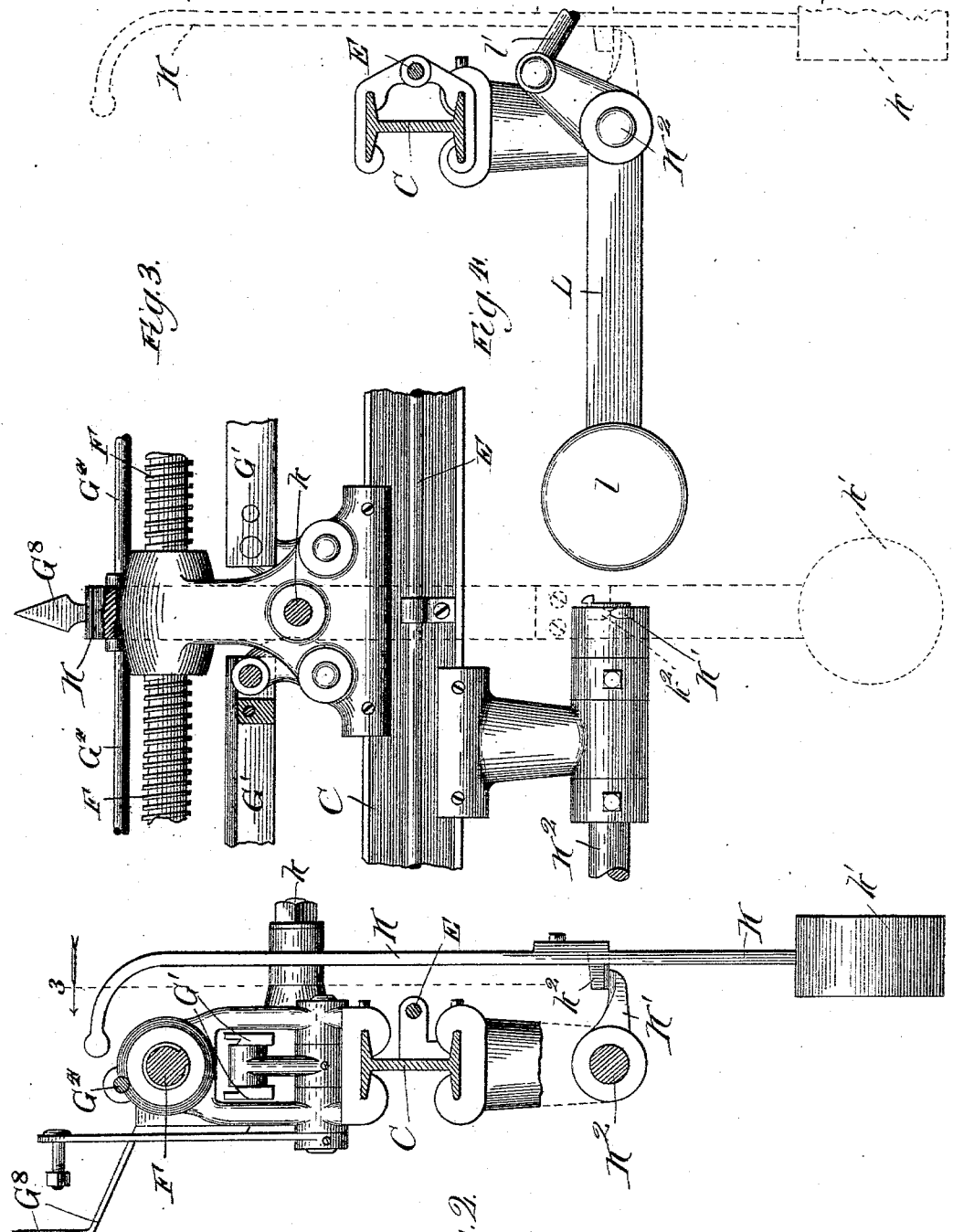

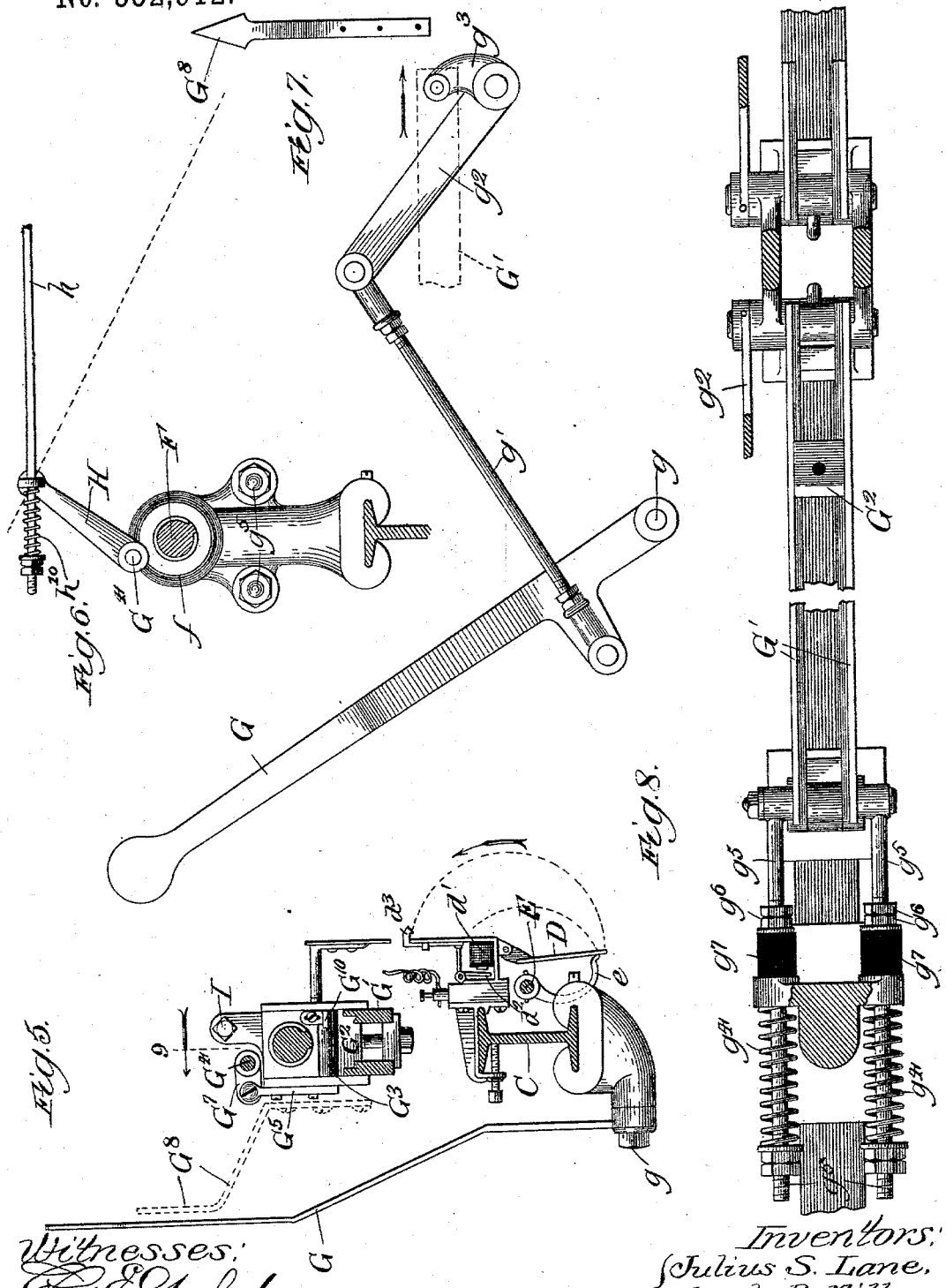

J. S. LANE & F. P. MILLS.
HOISTING ENGINE.

No. 552,912. Patented Jan. 14, 1896.

Witnesses:

Inventors:
Julius S. Lane,
Frank P. Mills.
By Banning & Banning & Sheridan,
Att'ys.

(No Model.) 7 Sheets—Sheet 6.

J. S. LANE & F. P. MILLS.
HOISTING ENGINE.

No. 552,912. Patented Jan. 14, 1896.

Witnesses:
Chas. E. Gaylord
Lute J. Alter

Inventors,
Julius S. Lane,
Frank P. Mills,
By Banning & Banning & Sheridan,
Attys.

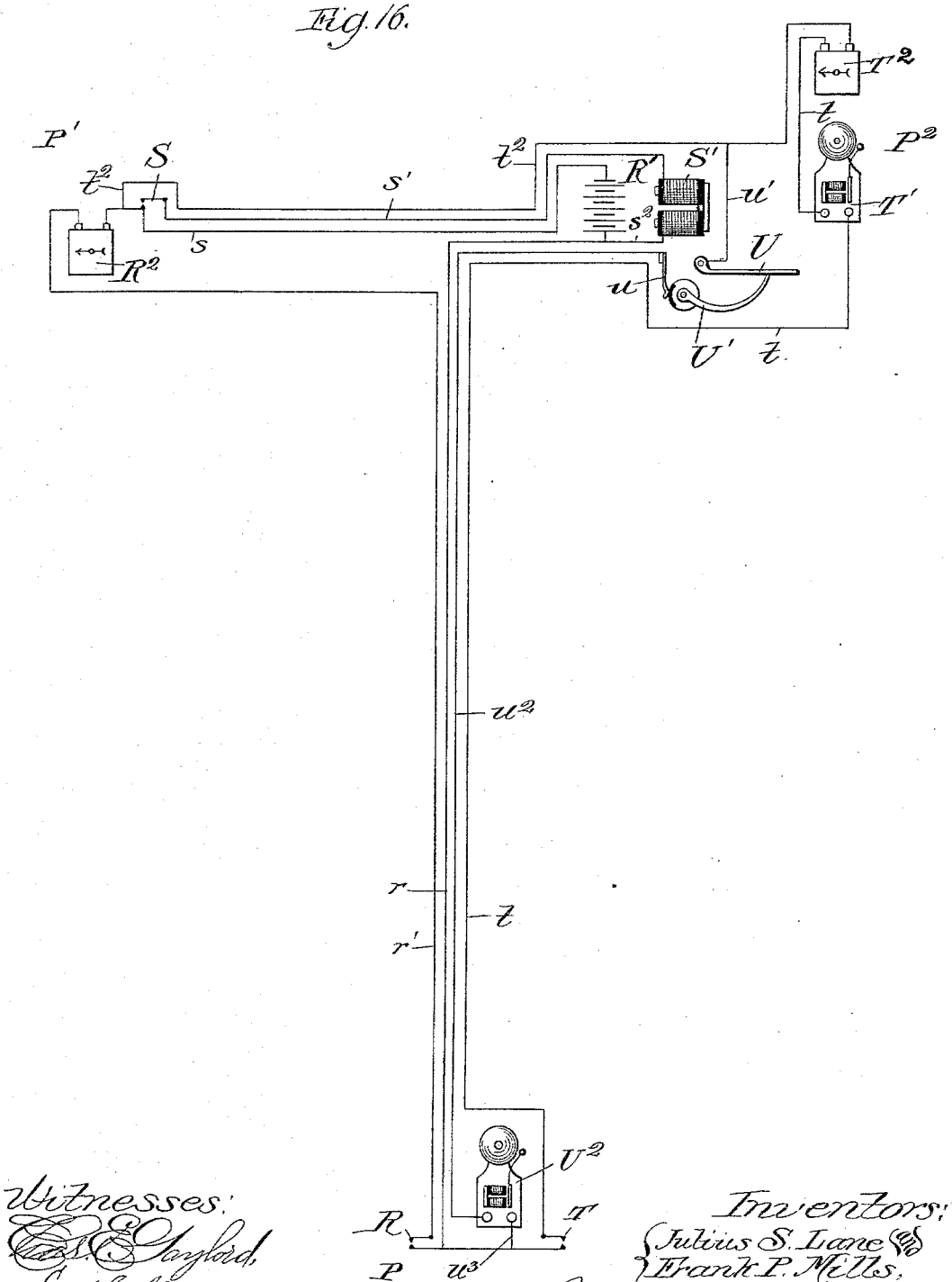

UNITED STATES PATENT OFFICE.

JULIUS S. LANE, OF OAK PARK, ILLINOIS, AND FRANK P. MILLS, OF ISHPEMING, MICHIGAN.

HOISTING-ENGINE.

SPECIFICATION forming part of Letters Patent No. 552,912, dated January 14, 1896.

Application filed June 21, 1894. Serial No. 515,244. (No model.)

*To all whom it may concern:*

Be it known that we, JULIUS S. LANE, residing at Oak Park, Illinois, and FRANK P. MILLS, residing at Ishpeming, Michigan, citizens of the United States, have invented certain new and useful Improvements in Hoisting-Engines, of which the following is a specification.

Our invention relates particularly to the indicator and safety mechanism to be used in connection with and operated by the movements of a hoisting-engine.

In the use of hoisting mechanism, particularly in mines where there are a number of different levels at which the car skip or cage must be stopped at different places, it is necessary that some means should be provided by which the engineer or operator may tell exactly at which level the operator in the mine desires the skip to be stopped. It is also desirable to have means to determine when the skip is at that level, and, as the skip travels at a high rate of speed, it is also very desirable to provide auxiliary mechanism to tell to a certainty and with greater accuracy than the ordinary mechanism when the car has approached that level.

Figure 9:
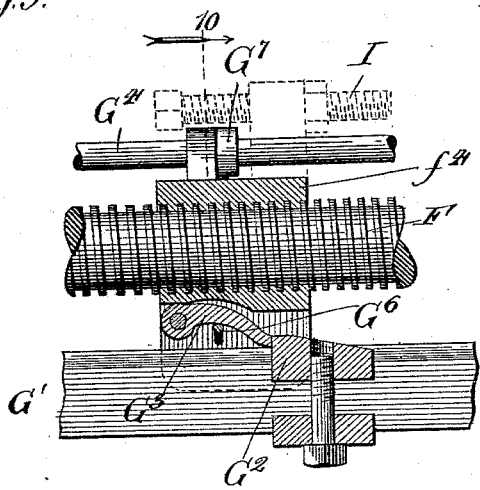
Figure 10:
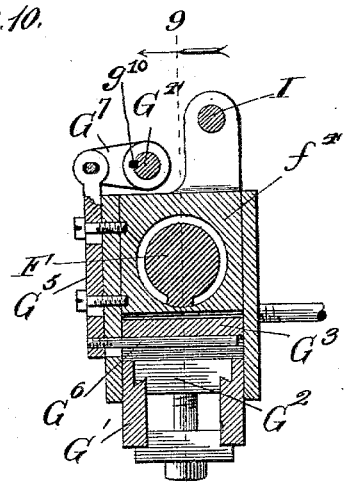
Figure 11:
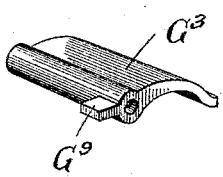
Figure 12:
Figure 13:
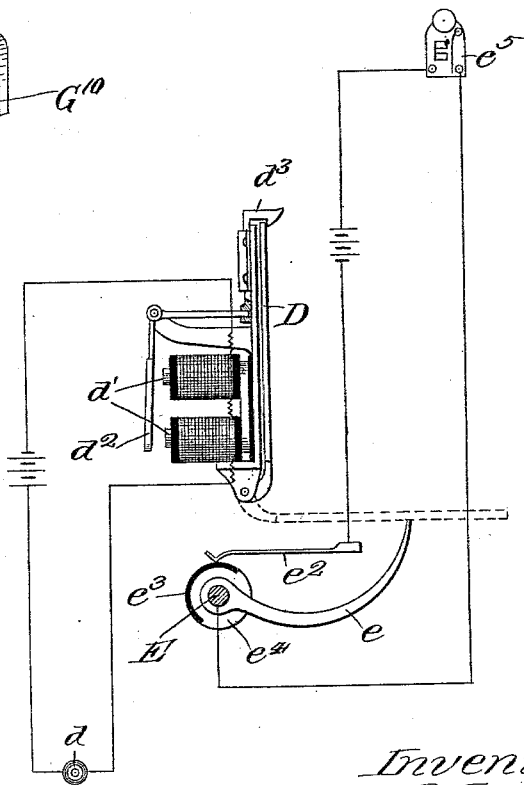
Figure 14:
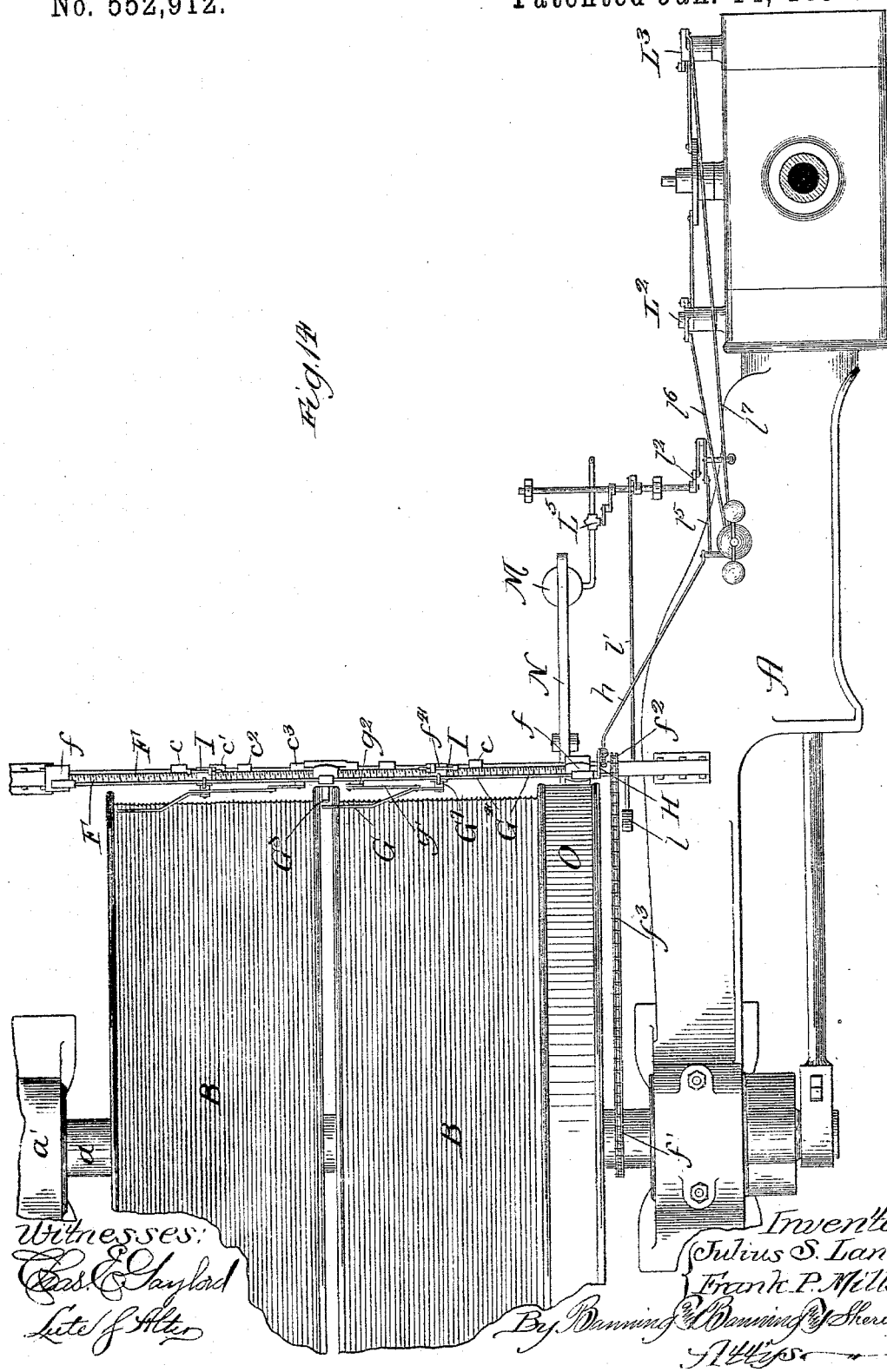
Figure 15:
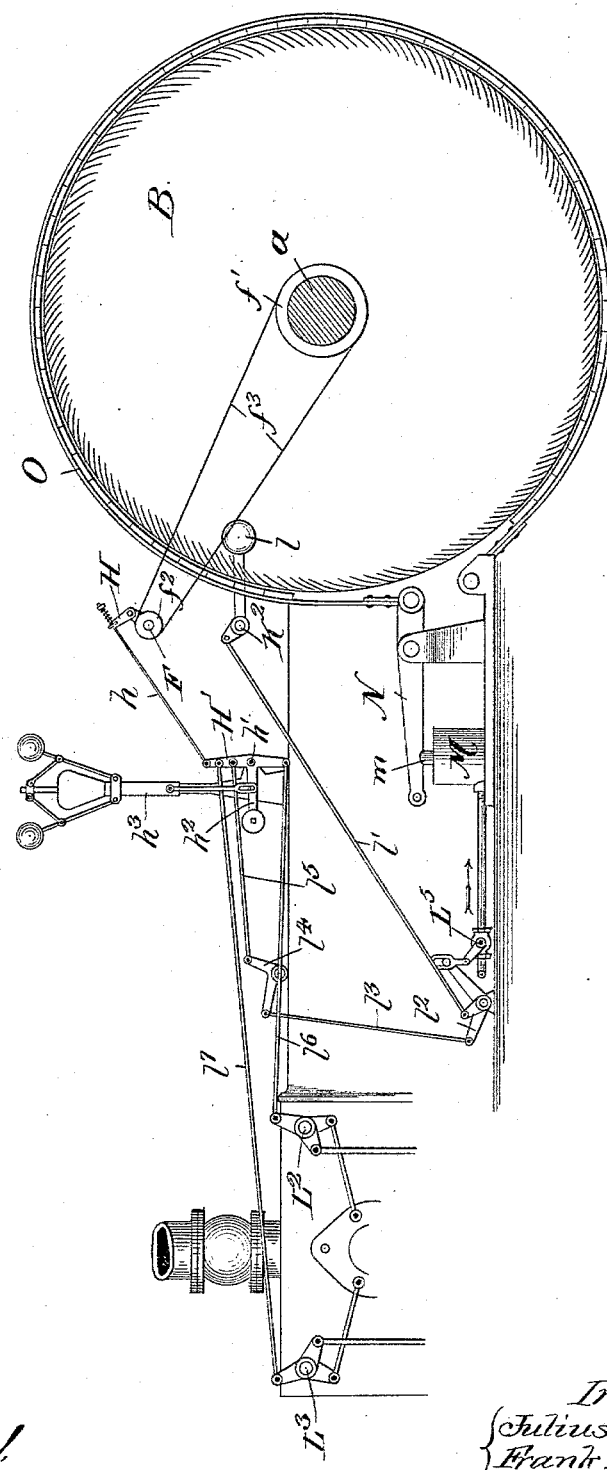

In the drawings, Figure 1 is a front elevation of a portion of the hoisting-engine, showing the indicating mechanism and means for operating the same; Fig. 2, an enlarged transverse section on line 2 of Fig. 1; Fig. 3, a front elevation of Fig. 2, taken on line 3 of Fig. 2; Fig. 4, an enlarged transverse section taken on line 4 of Fig. 1; Figs. 5 and 6, enlarged transverse sections taken on lines 5 and 6 of Fig. 1; Fig. 7, an enlarged diagram or detail of the quick hand detached from the rest of the mechanism; Fig. 8, a plan sectional view of a portion of the mechanism, taken on line 8 of Fig. 1; Fig. 9, a sectional view taken on line 9 of Figs. 5 and 10; Fig. 10, a transverse sectional view taken on line 10 of Fig. 9; Figs. 11 and 12, details of the tripping mechanism; Fig. 13, a diagrammatic view showing one electric circuit for operating the same; Fig. 14, a diagrammatic plan view of the hoisting-engine and lever connections for operating the valves; Fig. 15, a side diagrammatic view of a portion of the hoisting-engine and connections for operating the valves of the engine, and Fig. 16, a diagrammatic view showing the electric circuit as we intend to use it.

The object of our invention is to provide a simple, economical and reliable indicator and safety mechanism adapted to be operated by means of a hoisting-engine; and to this end our invention consists principally in an improvement in the means for signaling and indicating exactly at what level it is desired to have the car or skip stopped.

It consists, further, in the means for signaling back to the desired level that the engineer has heard and understands the signal.

It consists, further, in mechanism for indicating when the skip is at the desired level or at what portion of the shaft the skip is located.

It consists, further, in auxiliary mechanism to indicate with greater accuracy than the ordinary mechanism when the cage or skip is approaching or is at the desired level, and it consists finally in providing mechanism to stop automatically the mechanism when the cage has reached a given or danger point.

In making our improved mechanism we use an ordinary engine or pair of engines A, preferably of the Corliss type, provided with a crank-shaft $a$ mounted on suitable pillow-blocks $a'$. Upon this shaft we mount and secure, so as to be rotated with it, hoisting-drums B, provided with the usual cable attached in the ordinary manner to a cage or skip which is located in the shaft of a mine, so that by the rotation of this drum the cage is raised or lowered as desired. The mine may have several different levels, as is usual, and which may be at different distances apart. The total depths of the mines vary, according to circumstances.

An I-beam C is provided, having secured to it the desired number of targets $c$, $c'$, $c^2$ and $c^3$, lettered or numbered corresponding to the different levels of the mine. These targets are each provided with hinged targets D, adapted to be held normally in an upright position and cover the index-letters on the regular targets. To signal from the starting or shaft house, we provide electromechanical means, (particularly shown in Fig. 13,) so that when the button $d$, which is located in the shaft-house, is pressed the electric circuit is closed and the magnet $d'$ draws in the armature $d^2$, which in turn lifts the dog $d^3$ and allows the target D to drop by gravity into the position shown in dotted lines. This action enables the engineer to see at what level the operator in the mine desires the skip or carriage to be stopped.

To reset the drop-target and signal back to the operator that the engineer has heard and understands the signal and has brought the skip to that level for a load, we mount rotatably on the I-beam a rock-shaft E, (particularly shown in Figs. 1 and 13,) provided with a number of arms $e$, so that by rotating the shaft by means of the cord $e'$, which can be carried to any desired location, the arm $e$ is lifted up, carrying with it the target to its normal position, where it is held by means of the dog $d^3$.

In Fig. 13 the door is shown in dotted lines and the arm with its operating-shaft in full lines, and provided with an electric circuit, one end of which is electrically connected to the shaft and the other to a contact-piece $e^2$, which normally rests on the insulation $e^3$, thereby keeping the circuit open. In vibrating the shaft to carry the drop back to its normal position, the contact-piece passes off from the insulation and rubs against the metallic portion of the disk $e^4$, thereby closing the circuit and ringing the bell $e^5$, which is located at the point at which the signal was originally sounded. It will be understood, of course, that all of these targets are embraced in an electric circuit, and that each level is provided with a push-button closing the circuit to operate its target and a call-bell to notify the operator that the engineer has heard and understands the same.

To indicate at what position in the shaft the cage is located or passing we provide a screw F and mount it in suitable bearings $f$, which may be secured in any usual manner to the I-beam. This screw extends clear across the drum, may be made of any desired length, and is adapted to be rotated by means of sprockets $f'$ $f^2$ and a sprocket-chain $f^3$, geared up proportionally to the difference between the pitch of the drum and the pitch of the screw, so that the traveling indicator $f^4$, which is mounted on the nut of the screw, will travel from the first target $c$ to the last one $c^3$, while the skip is being raised from the lowest level of the mine to the top or dump, and the targets $c$, $c'$, $c^2$ and $c^3$ so located on the I-beam in relation to the different levels of the mine that when the traveling indicator is passing any of the targets or its point coincides with the point of the target the skip is exactly at that level.

As the movement of the car is very fast and the targets located comparatively close together the movement of the traveling arm will be necessarily slow, and a very slight movement of the traveling indicator will mean a much larger movement of the skip, so that ordinarily it would be very difficult to stop the skip on a level coincident with the level of the mine.

To provide means by which greater accuracy can be insured in reading and the approach of the skip to a level more closely determined, we provide what we term a "quick-hand" G, and pivot it at $g$ to any suitable portion of the I-beam. This quick-hand is connected to and operated by means of a system of levers and connecting-rods $g'$, $g^2$ and $g^3$ to a parallel bar G', which in turn is pivoted to the I-beam by means of suitable connections, so as to have a parallel motion. The parallel bar is held in its normal position by means of the spiral spring $g^4$ and the rod $g^5$, which are pivotally connected to it. The lock-nuts $g^6$ act as stops to limit the motion of the bar and prevent the motion of the spiral springs from pulling the bar over too far, the rubber pieces $g^7$ acting as cushions to deaden the shock when the bar is raised and as it returns to its up position.

To operate the bar by the movement of the traveling indicator, we provide the parallel bar with projecting lugs $G^2$ adapted to be engaged by a pawl $G^3$ pivoted on the traveling indicator in such manner as to engage with the projecting lug as the indicator moves in one direction—i. e., as the car is coming up or as the arm moves toward the center of the drums—and to pass or trip over the projecting lug as the traveling indicator moves in the opposite direction. To raise or lower this pawl, so that it may engage with or be disengaged from the lug, we pivot a rock-shaft $G^4$, preferably in the brackets which support the rotating screw, and provide the traveling indicator with a sliding plate $G^5$ having a projecting pin $g^6$, which passes under the lower edge of this pawl, so that the upward movement of the sliding block raises the pawl out of contact with the projecting lugs on the parallel bar and the downward movement of said sliding plate allows the pawl to be engaged with the projecting lugs of the parallel bar.

The sliding plate engages with a lever $G^7$ mounted on the rock-shaft $G^4$ so as to vibrate therewith but have an independent lateral movement. To obtain this result, the rock-shaft is provided with a longitudinal spline and the lever with a groove $g^{10}$ engaging with such spline, so that the vibrating of this rock-shaft and lever imparts a rectilinear motion to the sliding block. (Particularly shown in Figs. 9 and 10.) When the rock-shaft $G^4$ is vibrated to that position in which the pawl on the traveling arm is allowed to engage with the projecting lugs of the parallel bar as the arm travels along the screw, the parallel bar is moved forward, and by means of the system of levers and connecting-rods the quick-hand is actuated at a multiplied rate of speed from its normal position, as shown at the right hand of Fig. 1, until its outer end comes about opposite the point or stationary target $G^8$ between the two drums. This forward motion of the traveling indicator carries with it the parallel bar, which, swinging on the pivots, is forced to a lower plane until its projecting lug passes into such position as to be no longer contacted by the pawl of the traveling bar, such position being reached at the time that the quick-arm reaches a point to register with the stationary target $G^8$. The parallel bar being no longer engaged by the pawl of the traveling indicator is vibrated back to its normal position by means of its spiral springs, carrying with it the quick-hand to its normal position, and is ready to again indicate the next level, if it be so desired. As the quick-hand comes back to its normal position it impinges against the arm $g^8$, which may be provided with a rubber, pneumatic cushion, or dash-pot, to deaden the shock or prevent unnecessary vibrations of the arm.

As it is especially desirable to operate the quick-moving arm when the skip is moving fast, the rock-shaft $G^4$ is provided with a crank H and operating-rod $h$, (particularly shown in Figs. 1 and 6,) and mechanical diagrammatic view, Fig. 15, which may be run to a location suitable to be operated by the engineer, or connected with suitable mechanism to the governor. When connected to the governor, as shown in Fig. 15, the rod $h$ is pivoted to a compound lever H', which is pivoted at $h'$ to the frame of the engine. One of its weighted arms $h^2$ is connected to the loose vertical sleeve of the governor, so that during a high speed of the engine, the governor being rotated very rapidly, the weighted balls are moved by centrifugal force from the center toward their outermost limit and the sleeve $h^3$ raised, thereby carrying with it the arms $h^2$ of the lever. This motion through the connecting-rod $h$, which in turn is forced back, forces the crank H back toward the hoisting mechanism, which in turn vibrates the rod $G^4$ to the position shown in Fig. 10, allowing the pawl $G^3$ to drop so it can engage the sliding block $G^5$ on the traveling indicator and throw the quick-hand in its operation. A spring $h^{10}$ is inserted between the end of rod $h$ and the crank H, to act as a cushion and permit an easy raising of the pawl $G^3$.

It is necessary that the downward motion of the pawl $G^3$ should be capable of adjustment to regulate the amount of engagement between the projecting lugs on the parallel bar and the pawl. To accomplish this result, the pawl is provided with an opposite projecting finger $G^9$ (particularly shown in Fig. 11) and a small adjustable stop $G^{10}$, secured to the traveling indicator by means of a screw or otherwise (see Figs. 5 and 12) so that the projecting finger $G^9$ of the pawl will impinge against this block and prevent any further downward motion of the opposite end of the pawl. It will readily be seen that the amount of engagement between the pawl and the projecting lugs on the parallel bar may be regulated by the location of the adjustable stop $G^{10}$.

In illustrating our invention we have preferred to show a double hoisting-drum, the rope winding on the top of one and the bottom of the other, so that while one drum is hoisting one skip the other is lowering another, but the screw F has a continuous pitch in the same direction, so that one traveling indicator will be moved toward the center between the drums, while the other is moving away from the center to the outside of the drum. The same mechanism is used to operate the parallel bars, which are made independent of each other, (as particularly shown in Figs. 1 and 8,) the left one of Fig. 1 showing its quick-hand registering with the stationary pointer, to show that its car has approached the level corresponding to the one indicated by the traveling indicator and the target it is registered with.

As a skip or car is raised toward the top of the shaft, there is always danger, through carelessness or inattention on the part of the operators, of the skip being hoisted so high as to strike the upper beams of the shaft-house and endanger the lives of any persons in the skip or destroy the mechanism. To remedy this defect and provide means for automatically stopping the hoisting mechanism, we provide the block which carries the traveling indicator with a set-screw I, adapted to impinge against the upper free end of a vibrating lever K, pivoted at $k$ to the middle supporting-bracket of the rotating screw. The lower free end of the lever K is provided with a weight $k'$, for the purpose of keeping the lever in a normal vertical position. Secured to the lever in suitable location is a projecting finger $k^2$, adapted, when the lever is in its normal position, to engage with a projecting finger $k'$ on a rock-shaft $K^2$, which is mounted in suitable brackets on the I-beam. The opposite end of the rock-shaft is provided with a weighted lever L, which normally serves to hold the projecting fingers on the rock-shaft and vibrating lever K in contact with each other.

As the screw I on either of the traveling blocks $f^4$ impinges against the upper free end of the vibrating lever K, it moves the opposite end of the lever to one side of the other, thereby carrying its projecting finger out of engagement with its projecting finger on the rock-shaft. The weight $l$ on the lever L is carried down by gravity, thereby vibrating the rock-shaft, and by means of the rod $l'$ (see diagrammatic view, Fig. 15) vibrates lever $l^2$ so as to raise the connecting-rod $l^3$ and vibrate the compound lever $l^4$, pushing the lever H' back toward the hoisting mechanism by means of the connecting-rod $l^5$, said motions serving, through the rods $l^6$ and $l^7$, to vibrate the cylinder-valves $L^2$ and $L^3$ of the engine to such a position as to shut off the steam supply to the cylinder. The same motions through the movement of the lever $l^2$ operate an arm on a valve $L^5$, which allows a supply of steam, water, or compressed air to enter a cylinder M, thereby raising the piston-rod $m$ in the same, raising the outer end of the lever N depressing its inner end, and applying the band-brake O to the hoisting mechanism, instantly stopping the same.

Figs. 2, 3, and 4 show enlarged details of the mechanism above described, and Fig. 15 a diagrammatic view of the entire mechanism.

In Fig. 16 is shown a diagrammatic view of the electric circuit which runs from each level in the mine to the shaft or signal house and the engine-room. P is the level of a mine, P' the shaft or signal house, and P² the engine-room. When an operator in the mine has brought a load to the shaft, he presses the button R. Current then flows from the battery R' through the wires $r\ r'$ to the indicator R² in the shaft-house, which indicates at what level a load is waiting for the cage or skip, thence back by wire $s$ to battery. The dispatcher in the shaft-house can notify the engineer, when he may desire, that a load is waiting at such level by pressing the button S, when current will flow from the battery through wire $s$ to the key or button S, through wire $s'$ to the magnet S', and actuating its armature drops the target, thus showing the engineer at what level a load is waiting for the cage, back by wire $s^2$ to battery.

The engineer sends the cage to the level indicated as having a load waiting, and informs the operator in the mine at such level that the cage is there and waiting ready to be loaded by raising the drop-target U. This action brings the metallic portion of arm U' into contact with brush U, so that current will flow from the battery through wires $s$, $t^2$, and $u'$, target U rocking arm U', contact-piece $u$, wire $u^2$ to the bell U², which will signal the operator that the engineer understands and that a cage or skip is waiting at that particular level for a load, thence by wires $u^3$ and $r$ back to battery.

The operator hearing the signal from the engineer that informs him that the cage is waiting at that level for a load proceeds to run a car on and having done so he signals the engineer to hoist the same by pressing the button T, when current will flow from the battery through wire $r$, through button T, through wire $t$, to the signal-bell T' in the engine-room and through wire $t'$ to the indicator T², thus giving the engineer both a visible and audible signal.

The foregoing signal-circuits provide for an economical system by which the movements of a cage or skip may be controlled and prevent haphazard operation of the mechanism which would otherwise result in unnecessary travel of the cage—as, for instance, should there be six levels in a mine-shaft the engineer would naturally run to the lower level every time. Now, if the dispatcher, knowing of the movements of the cage, signals that loads are waiting only at levels 4, 3, and 2, the engineer will then send the cage down to level 4, thus saving the wear and power lost in sending to the lowest level.

While we have described with considerable minuteness the operation of the connecting mechanism between the traveling block and the valves of the engine, we do not desire to be limited thereto, this being merely a preferred form, as it will be evident to the skilled mechanic that other devices could be interposed between this traveling block and other valves of the engine for accomplishing the same result. We have also illustrated throughout the drawings double hoisting-drums, and but one engine attached to the same; but in actual practice we intend to use double engines and operating-cranks in opposite ends of the crank-shaft. We do not, however, desire to be limited to a double engine, as it is evident one of the drums could be dispensed with when only one skip or cage is used.

We have also shown and described the indicating mechanism as being located in a horizontal plane, but it is evident that this could be located vertically and with but few mechanical changes be operated as successfully as in a horizontal plane; and while throughout we have described our invention with considerable minuteness as to detail we do not desire to be limited thereto unduly any more than is pointed out in the claims. On the contrary, we contemplate changes in form, construction, and arrangement, and the use of equivalents, as circumstances may suggest or render expedient.

We claim—

1. In hoisting machinery, the combination of mechanism for raising or lowering a cage or skip, mechanism adapted to be operated by electricity for indicating the level at which a car is needed, electrically actuated mechanism for indicating that a car is loaded and electrically actuated indicating mechanism for giving a return signal to the level, substantially as described.

2. In hoisting machinery, the combination of mechanism for raising and lowering a skip, a target having any desired index, a drop pivoted thereto and arranged to cover the index, means adapted to be operated by electricity for releasing and opening such drop, so that the index may be seen, and means for closing such door and simultaneously sounding a return signal, substantially as described.

3. In hoisting machinery, the combination of mechanism for raising and lowering a skip, indicating mechanism for indicating the position of the skip in the main shaft, means for operating such indicator mechanism, and an auxiliary indicator for indicating with greater accuracy the approach of the skip to a level, substantially as described.

4. In hoisting machinery, the combination of mechanism for raising and lowering the skip, a series of targets having indicator characters for different levels of a mine, a traveling indicator so arranged that when it registers with a target the skip is opposite the corresponding level of the mine, means for actuating such traveling indicator, and an auxiliary indicator for indicating with greater accuracy the approach of the skip to a desired level, substantially as described.

5. In hoisting machinery, the combination of mechanism for raising or lowering a skip, a series of targets having indicating characters for different levels in a mine, traveling indicator so arranged that when it registers with a target, the skip is opposite the corresponding level of the mine, means for actuating such traveling indicator, and an auxiliary indicator adapted to be actuated by the movements of the traveling indicator for indicating with greater accuracy the position of the skip, substantially as described.

6. In hoisting machinery, the combination of mechanism for raising or lowering a skip, one or more targets having indicating characters for different levels of a mine, a traveling indicator so arranged that when it registers with a target the skip is opposite the corresponding level of the mine, means for actuating the traveling indicator, a parallel bar having projecting lugs, an indicating lever arm connected with and adapted to be operated by the movements of the parallel bar for indicating with greater accuracy the position of the skip, and mechanism attached to the traveling indicator for actuating the traveling bar.

7. In hoisting machinery, the combination of mechanism for raising and lowering a skip, one or more targets having indicating characters for different levels of a mine, a traveling indicator so arranged that when it registers with a target the skip is opposite the corresponding level of the mine, means for actuating the traveling indicator, a parallel bar having projecting lugs, means for holding the parallel bar in its normal position, mechanism attached to the traveling indicator for actuating the parallel bar, an indicating lever-arm for indicating with greater accuracy the position of the skip connected with and adapted to be operated by the movements of the parallel bar, and a stationary target so arranged that when the indicating lever arm registers with it the skip is opposite a desired level, substantially as described.

8. In hoisting machinery, the combination of hoisting mechanism for raising and lowering a skip, a motor for operating the hoisting mechanism, one or more targets having indicating characters for different levels of a mine, a traveling indicator so arranged that when it registers with a target the skip is opposite the desired level, means for operating the traveling indicator, a rock shaft connected with the source of motive power, and a vibrating lever arranged adjacent to and adapted to be contacted by the traveling indicator, and to hold such rock shaft in its inoperative position until contacted by the indicator when the rock shaft is permitted to operate and shut off the motive source, substantially as described.

9. In hoisting machinery, the combination of hoisting mechanism for raising and lowering a skip, a motor for operating the hoisting mechanism, one or more targets having indicating characters for different levels of a mine, a traveling indicator so arranged that when it registers with a target the skip is opposite the desired level, means for operating the traveling indicator, a rock shaft connected with the source of motive power, a vibrating lever arranged adjacent to and adapted to be contacted by the traveling indicator and hold such rock shaft in its inoperative position until contacted by the indicator when the rock shaft is permitted to operate, a brake connected with the hoisting mechanism and the rock shaft, the whole arranged so that when the rock shaft is permitted to operate it shuts off the source of motive power and applies the brake, substantially as described.

10. In combination with mine hoisting machinery, an electric signaling apparatus, consisting of a push-button located in a mine level, an indicator in a signal or shaft house, a push button in such shaft house, a drop target in a motor room, a second push-button in the mine level, a signal bell and indicator in the motor room, a signal bell in the mine level, arranged to be sounded when the drop target is restored to its normal position, and an electric circuit embracing such push buttons, targets, indicators and signal bells, substantially as described.

JULIUS S. LANE.
FRANK P. MILLS.

Witnesses:
THOMAS F. SHERIDAN,
THOMAS B. MCGREGOR.